US008001274B2

(12) United States Patent
Srinivasan et al.

(10) Patent No.: US 8,001,274 B2
(45) Date of Patent: Aug. 16, 2011

(54) MOBILE DEVICE NETWORK ACCESSORY SUPPORTING CONTENT INTEGRATION BETWEEN ACCESSORY DATA AND INTERNET CONTENT

(76) Inventors: Sudharshan Srinivasan, Fremont, CA (US); Kothandraman Ramchandran, Fremont, CA (US); Jai Kumar, Cupertino, CA (US)

( * ) Notice: Subject to any disclaimer, the term of this patent is extended or adjusted under 35 U.S.C. 154(b) by 147 days.

(21) Appl. No.: 12/454,195

(22) Filed: May 14, 2009

(65) Prior Publication Data

US 2010/0293217 A1  Nov. 18, 2010

(51) Int. Cl.
G06F 15/16 (2006.01)
(52) U.S. Cl. .......................................... 709/246; 709/202
(58) Field of Classification Search .................. 709/202, 709/246
See application file for complete search history.

(56) References Cited

U.S. PATENT DOCUMENTS

| | | | |
|---|---|---|---|
| 5,727,159 A * | 3/1998 | Kikinis .......................... 709/246 |
| 6,209,048 B1 * | 3/2001 | Wolff .............................. 710/62 |
| 6,233,318 B1 * | 5/2001 | Picard et al. ................ 379/88.17 |
| 6,243,596 B1 * | 6/2001 | Kikinis .......................... 455/572 |
| 6,484,196 B1 * | 11/2002 | Maurille ....................... 709/206 |
| 6,553,410 B2 * | 4/2003 | Kikinis .......................... 709/218 |
| 6,792,085 B1 * | 9/2004 | Rigaldies et al. ........... 379/88.13 |
| 7,058,683 B1 * | 6/2006 | Belissent et al. ............. 709/206 |
| 7,234,107 B1 * | 6/2007 | Aoki et al. .................... 715/207 |
| 7,480,711 B2 * | 1/2009 | Lownsbrough et al. ...... 709/223 |
| 7,606,595 B2 | 10/2009 | Srinivasan et al. |
| 2003/0128987 A1 * | 7/2003 | Mayer ............................. 398/98 |
| 2006/0281437 A1 * | 12/2006 | Cook ........................ 455/404.2 |
| 2009/0313318 A1 * | 12/2009 | Dye et al. ..................... 709/202 |
| 2010/0100735 A1 * | 4/2010 | Rajan et al. ................... 713/168 |
| 2010/0151853 A1 * | 6/2010 | Pomerantz et al. ........... 455/427 |
| 2010/0201567 A1 * | 8/2010 | Lydon et al. ............. 342/357.04 |
| 2010/0234051 A1 * | 9/2010 | Holden et al. ................ 455/466 |
| 2010/0293217 A1 * | 11/2010 | Srinivasan et al. ............ 709/202 |

* cited by examiner

*Primary Examiner* — Aaron Strange

(57) ABSTRACT

An accessory device (33) to a mobile device (31) is described that enables enhanced internet content viewing experience, where internet content is enhanced using data from accessory device (41). This is achieved by combining an embedded web proxy server (37) into the accessory device (33) with enhancements that support merging data from the accessory device (41) into internet content. This enables accessory devices (33) to be used with both closed and open mobile devices (31).

19 Claims, 10 Drawing Sheets

METHOD TO SHOW CONTENT INTEGRATION BETWEEN ACCESSORY DATA AND INTERNET CONTENT IN MOBILE DEVICE ACCESSORY – RECEIVE PATH

MOBILE DEVICE WITH ACCESSORY SUPPORTING INTERNET CONNECTION

DETAILS OF ACCESSORY DEVICE

MOBILE DEVICE NETWORK ACCESSORY SUPPORTING CONTENT INTEGRATION BETWEEN ACCESSORY DATA AND INTERNET CONTENT

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

The present invention generally relates to accessory devices for mobile devices and specifically to accessory devices used to provide internet communication along with other accessory functionality.

Mobile devices are engineered for specific functionality based on market segments they are targeted towards. A mobile device can be one of personal digital assistant, a mobile phone or a personal music player. Users of these devices may require enhanced communication functionality that is not already provided in the mobile device of interest.

For example, a user may have a personal digital assistant that may not provide cellular connectivity. Hence the user may desire to add cellular connectivity. This may be provided by an external accessory device which may be physically or wirelessly connected to the mobile device.

Most accessory devices provide dedicated functionality such as a connection to cellular data network, or provide a cellular call access. To use services of such accessory devices, a corresponding device driver needs to be loaded into the mobile device so that appropriate protocol to access accessory functionality may be exercised.

But this can be a big limitation as a number of mobile devices are closed devices and new device drivers cannot be loaded into such devices. Closed devices are those that do not allow new software programs to be installed without appropriate agreements with device manufacturers. Sometimes closed devices do not have the ability to provide extension services, since the bill of materials may be optimized to provide fixed functionality, hence addition of new device drivers may not be possible.

Hence there is a need for a method that enables using accessory devices without the need for loading native code or device drivers into a mobile device.

This is solved by some prior art systems that suggest using an embedded web server in accessory devices. A mobile device that has an embedded web browser may use the web browser to connect to the accessory using standard hyper text transmission protocol (HTTP) to receive hyper text markup language (HTML) pages to get access to the functionality provided by the accessory.

This method works provided the accessory device provides only one function and does not have to provide access to a network that may also be providing HTML pages at the same time, hence resulting in a conflict.

Such a case arises when an accessory device may act as a gateway to an external network providing HTML pages, and simultaneously providing HTML pages to represent accessory functionality.

In particular, if an accessory device provides access to a cellular data network that may be used for fetching HTML pages from the world wide web or the internet, and also provides functions to establish circuit switched calls, then when a user is using the cellular data network connection to receive HTML pages from the internet, and receives a call using the call function of the accessory device at the same time, there will be a conflict between HTML pages received from the internet and those that are generated internally at the accessory device to represent the call functionality.

Such a conflict may arise for any communication accessory that provides access to the internet that provides HTML pages, and also provides HTML pages to represent accessory functionality.

Accessory devices that provide internet access along with other functionality are of great importance now, since the number of applications that are hosted at a remote site in the internet has increased exponentially and all such applications may benefit from the additional accessory functionality and vice versa.

Further examples of such accessory devices that fit into this category are accessories that provide internet connectivity along with one of the functionalities including a global position system (GPS) receiver, a camera, and a medical device.

A user may want to add a camera as an accessory to a mobile device, and also interoperate the image generated by the camera into a social networking site. This is possible only if the accessory device provided both the networking functionality and the camera functionality so that the network stream data can be enhanced with the image generated.

Similarly, a user may want to add GPS co-ordinates to maps obtained from the internet in a mobile device. This could be tried by using a stand alone GPS accessory device. If the mobile device supported a separate networking interface, then it may obtain the maps from an internet site directly, and then obtain the GPS co-ordinates from the stand alone GPS accessory. But the data received from internet will be in a stream that is independent of data received from stand alone GPS accessory, with no way to correlate the two data streams without custom code in the mobile device and using only a browser to access accessory functionality This can be solved only by having a GPS accessory device that also supports networking function, enabling the two data streams to be combined at the accessory and then routed into the mobile device to provide a integrated accessory functionality that enhances internet data with accessory functionality and vice versa.

Similarly, if a medical website needs updates from a patient medical device monitor periodically, and the user is using a closed mobile device that supports a web browser, it is imperative that the medical device accessory support networking function that enables combining data from the accessory into the network stream sent to a web site. Otherwise a closed mobile device may not be usable as data from medical device will not interoperate with data from internet. This is because cross site scripting is usually not allowed in any mobile device web browser.

Hence it can be seen that there is a need for a method that provides accessory devices to mobile devices that can interoperate with data from internet to support both closed and open mobile devices that support a browser and networking interface.

Currently there are no known prior art methods that offer a solution to this problem.

Following paragraphs in current section describe relevant prior arts in this field.

Prior art US Doc 20080200208 proposes adding a accessory device to a mobile device that already has a wide area networking interface with a new wide area networking interface, either with physical connection or wirelessly. But this method uses pre-established protocols across the mobile device and the accessory. Thus this method mandates loading native device driver code into the mobile device, hence not addressing the needs of users who want to add a mobile device accessory to a closed mobile device.

Prior art U.S. Pat. No. 6,865,732 suggests using a customized embedded web server with small foot print devices. This addresses a need for enabling web servers into devices that have highly optimized bill of materials. But this does not address the need of an accessory device to interoperate with data from the internet.

Prior art US Doc 20090099668 provides a embedded web server to in building equipment so that building equipment data can be seen in a web server, eliminating the need for a custom user interface in host devices. Although this method proposes using an embedded web server in building equipment, this does not address the need where data from building equipment needs to interoperate with data from the internet.

Prior art US Doc 20080091175 also provides a embedded web server to access medical device functionality using HTML web pages, hence offering access to medical device functionality as an independent data stream. But this does not address the need where data from medical equipment needs to interoperate with data from the internet.

As can be seen from above, all known prior arts suffer from some limitations in offering a solution to address the need for an accessory device that can enhance internet content without loading new device drivers into the mobile device.

3. Objects and Advantages

Accordingly, several objects and advantages of the present invention are:

a) to provide an accessory to a mobile device, that can interoperate with content from internet without loading native device drivers into the mobile device;

b) to provide an accessory to a mobile device, that enhances applications programmed using HTML and are deployed in the internet; and c) to provide an accessory to a closed or open mobile device with additional functionality that can interoperate with contents of internet.

SUMMARY

In accordance with present invention a method is described that enables providing a mobile device with an accessory device that can enhance internet content without the need to load new device drivers and hence supporting both open and closed devices that need enhanced accessory and internet functionality.

This is achieved by providing an accessory device with an enhanced embedded proxy web server that can alter content from the internet with data that is locally generated at the accessory devices related to accessory functionality.

A proxy web server usually is an intermediate web server that enables caching or access control of web pages. Hence it intercepts all connections from web browsers in client machines and provides a cached version of web pages or stops access to a web site altogether.

Hence using a proxy web server in an accessory device enables interception of web browser connections from a mobile device to fetch data from the internet and modify it as necessary.

This method of combining an embedded proxy web server with data from internet and data from accessory device to provide a single combined web page to a mobile device is not known to exist in prior art.

Such an accessory device that provides an enhanced form of proxy web server provides an enhanced internet experience to users of mobile devices, as internet content may be enhanced with accessory functionality.

This can be seen by some examples, such as a user wanting to add camera functionality and upload captured images to a social networking site, or a user wanting to add a cellular connection along with accessing internet data, or a user wanting to upload blood pressure readings to internet using an accessory device that interoperates with a mobile device such as a personal digital assistant (PDA).

Hence combining an accessory device with an enhanced embedded proxy web server, provides an unobvious result of enhancing internet content with accessory functionality and vice versa.

An accessory device used without internet content integration, may provide data to a mobile device to use the data in context of applications in a mobile device, but when combined with internet content, its use is magnified many times over, since the number of applications in the internet has no bounds. Hence combining an accessory functionality with internet content benefits both the accessory and internet content.

DRAWINGS—FIGURES

Figure 1:
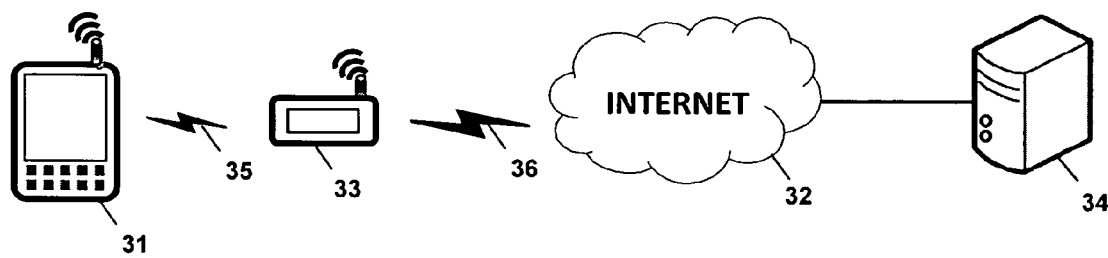
FIG. 1 shows end to end system with mobile device using an accessory device to access internet content and enhance the content with accessory data.

DRAWINGS—REFERENCE NUMERALS 31 mobile device
32 internet
33 mobile device accessory
34 web server
35 mobile device networking interface
36 internet networking interface 37 embedded proxy web server
38 internet content and accessory data combining module
39 set of hardware and software modules
40 data from internet
41 data from accessory device
42 combined data
43 mobile device content
44 personal digital assistant
45 mobile phone
46 smart phone
47 portable media player
48 GPS accessory with internet connection
49 cellular call accessory with internet connection
50 camera accessory with internet connection
51 step
52 step
53 step
54 step
55 step
56 step
57 step
58 step
59 step
60 step
61 step
62 step
63 step
64 combined request data
65 step
66 prior art GPS accessory device
67 native device driver
68 embedded web browser
69 dotted arrow path
70 javascript engine in browser
71 prior art cellular call accessory device
72 call interface within the web page

DETAILED DESCRIPTION OF PREFERRED EMBODIMENT

In the following description, first an end to end system is described that makes use of a mobile device with the accessory of present invention to provide a user of a mobile device extended hardware functionality that enhances the applications in the internet. Then accessory device of present invention is described in detail, followed by a flow chart that describes the method used in the accessory device to achieve desired results. Then two use cases showing the differences between prior art accessory device and accessory device of present invention are described.

FIG. 1 shows end to end system where a mobile device 31 connects to internet 32 using a mobile device accessory 33 of present invention. Internet 32 is connected to a web server 34 that provides web pages in response to requests from mobile device 31. Accessory device 33 intercepts requests from mobile device and passes the request to web server 34. Response from web server 34 is again intercepted by accessory device 33 that then combines data from accessory device 33 with data from internet and generates a combined web page that is then sent to mobile device 31. Accessory device 33 is connected to mobile device 31 using mobile device networking interface 35 that can be either a physical connection or a local area wireless connection. Accessory device 33 is connected to internet 32 using internet networking interface 36 that uses wide area packet data wireless connection.

Figure 2:
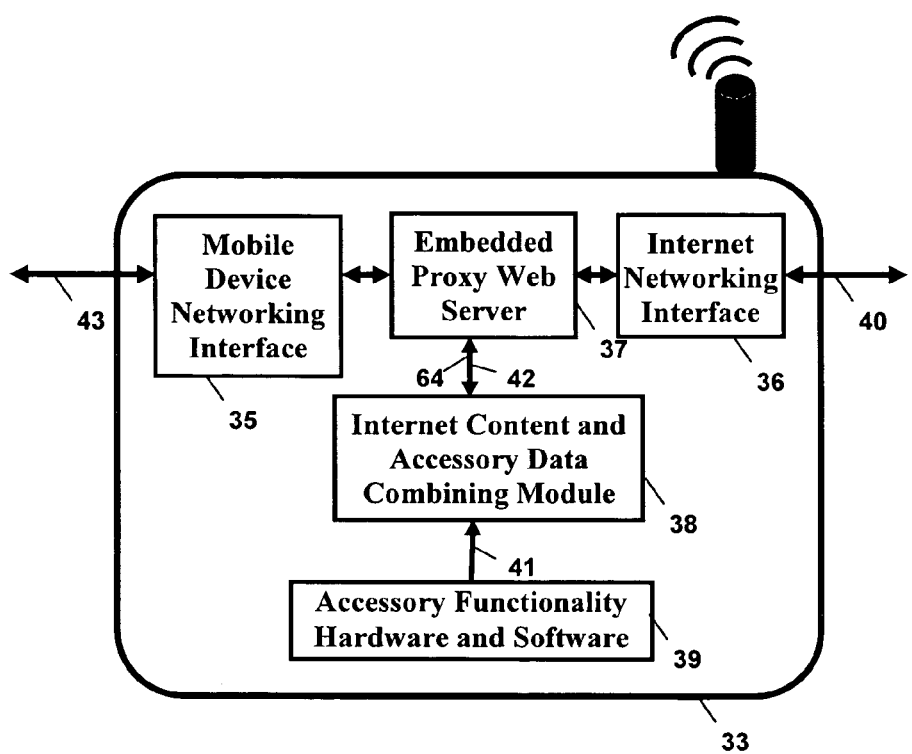
FIG. 2 shows details of accessory device.

FIG. 2 shows details of mobile device accessory 33. It includes mobile device networking interface 35, internet networking interface 36, a embedded proxy web server 37, internet content and accessory data combining module 38, and set of hardware and software modules 39 that represent accessory functionality in addition to internet connectivity.

Mobile device networking interface 35 enables connectivity to mobile device 31 and internet networking interface 36 enables connectivity to internet 32. Embedded proxy web server 37 is used to intercept requests from mobile device 31 and response from web server 34. Data combining module 38 is used to combine data from internet 40 with data from accessory device 41, to generate combined data 42 that is then forwarded to mobile device 31 as mobile device content 43. The data from internet can be in any standard internet format including HTML or XML.

Data combining module 38 can add accessory related data to a web page received from web server 34 or it can change the style or add graphics that are related to data from accessory 41. Data combining module 38 may be implemented as plugin module to embedded proxy web server 37. Similarly, data from accessory 41 may be added into a web page request that may be forwarded to web server 34.

In one embodiment of this invention, this enables users to update social networking sites using data from accessory device 41.

Figure 3:
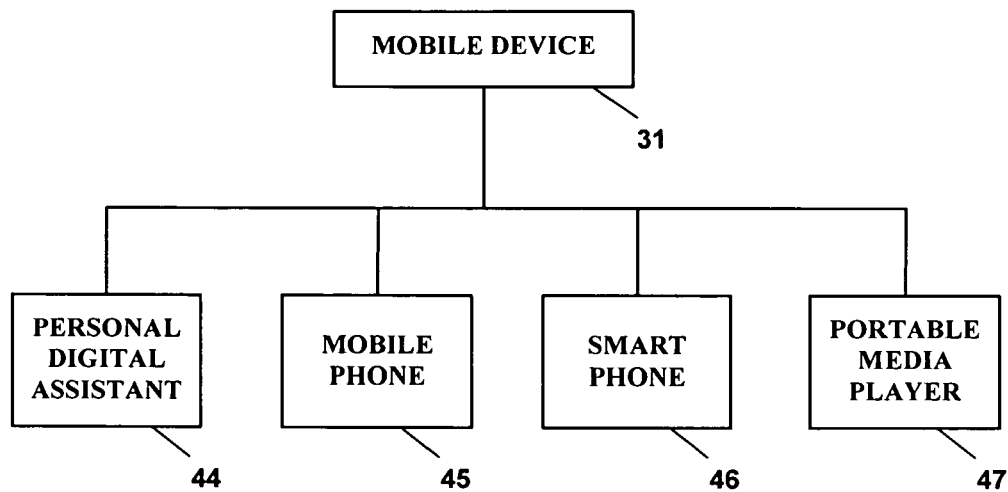
FIG. 3 shows embodiments of mobile device.

FIG. 3 shows that mobile device 31 can be one of personal digital assistant 44, mobile phone 45, a smart phone 46, and a portable media player 47 and any mobile device that supports a standard web browser and network interface to get HTML pages.

Figure 4:
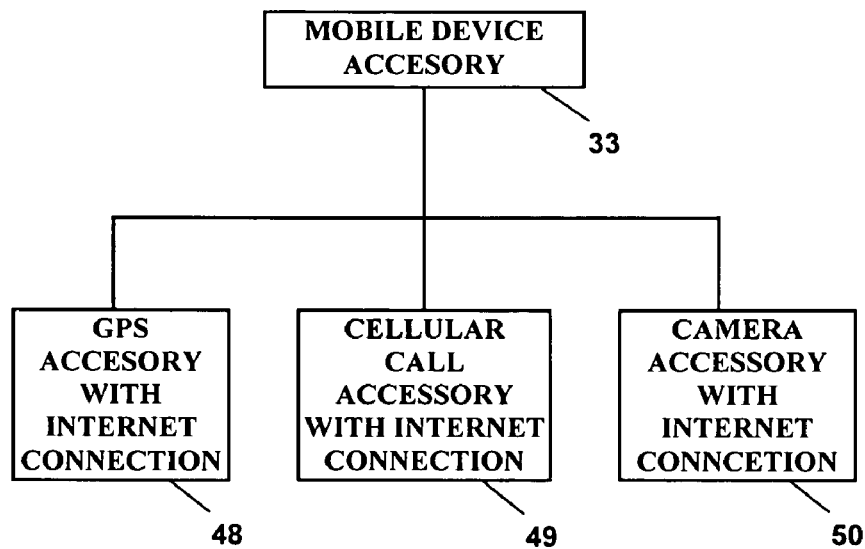
FIG. 4 shows embodiments of accessory device of present invention.

FIG. 4 shows that mobile device accessory 33 can be one of GPS accessory with internet connection 48, a cellular call accessory with internet connection 49, a camera accessory with internet connection 50, and any other accessory device with internet connection.

Figure 5:
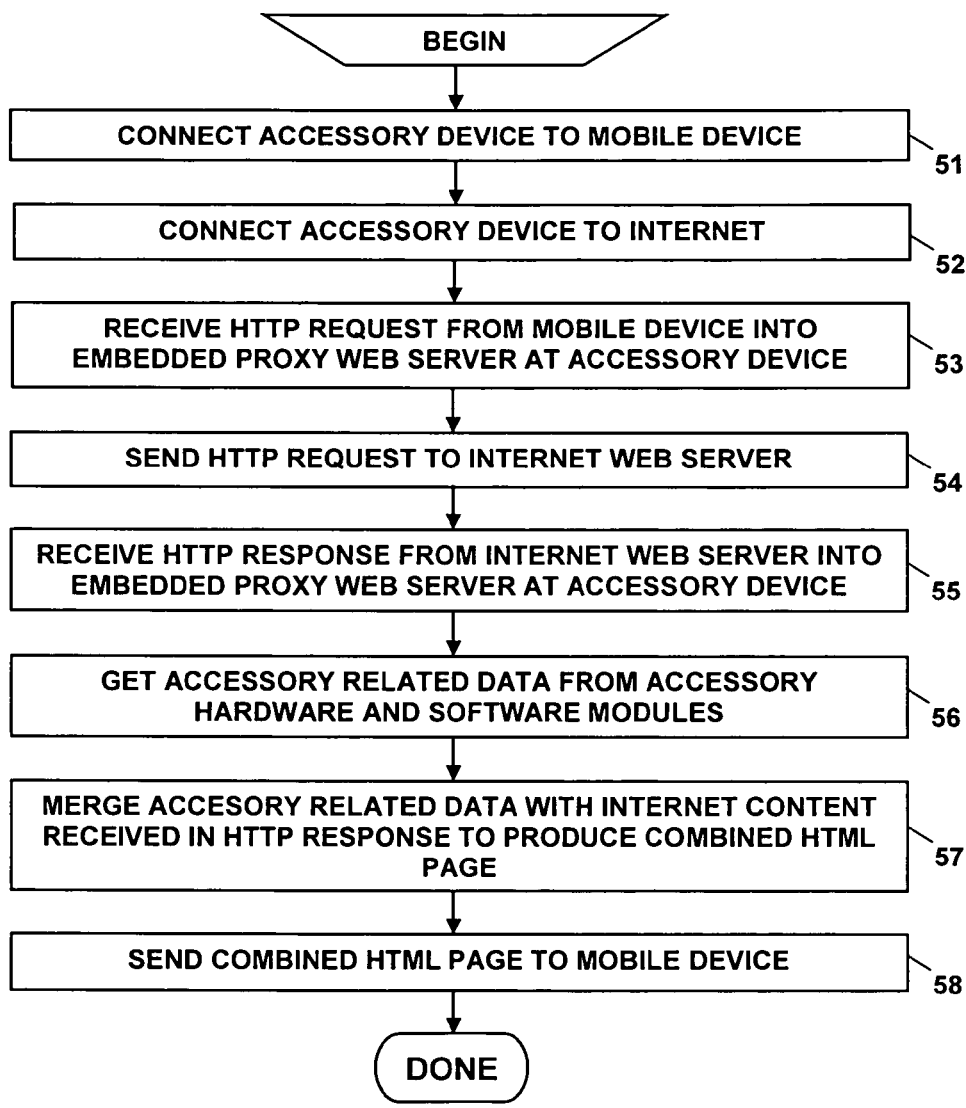
FIG. 5 shows a flow chart of accessory device receiving data from internet and enhancing the internet data using data from accessory.

FIG. 5 shows a flow chart of method for receiving a HTML page from web server 34 that is processed by accessory device 33.

In step 51 accessory device 33 is connected to mobile device 31 using mobile device networking interface 35.

In step 52 accessory device 33 is connected to internet 32 using internet networking interface 36.

In step 53 a HTTP request from mobile device 31 is received and passed to embedded proxy web server 37.

In step 54 the HTTP request is routed to web server 34.

In step 55 a response to the HTTP request is received into embedded proxy web server 37 as data from internet 40.

In step 56 accessory related data 41 is queried from set of hardware and software modules 39.

In step 57 accessory related data 41 is merged with data from internet 40 by data combining module 38 to produce a combined HTML page as combined data 42.

In step 58 combined data 42 is routed to mobile device 31.

Figure 6:
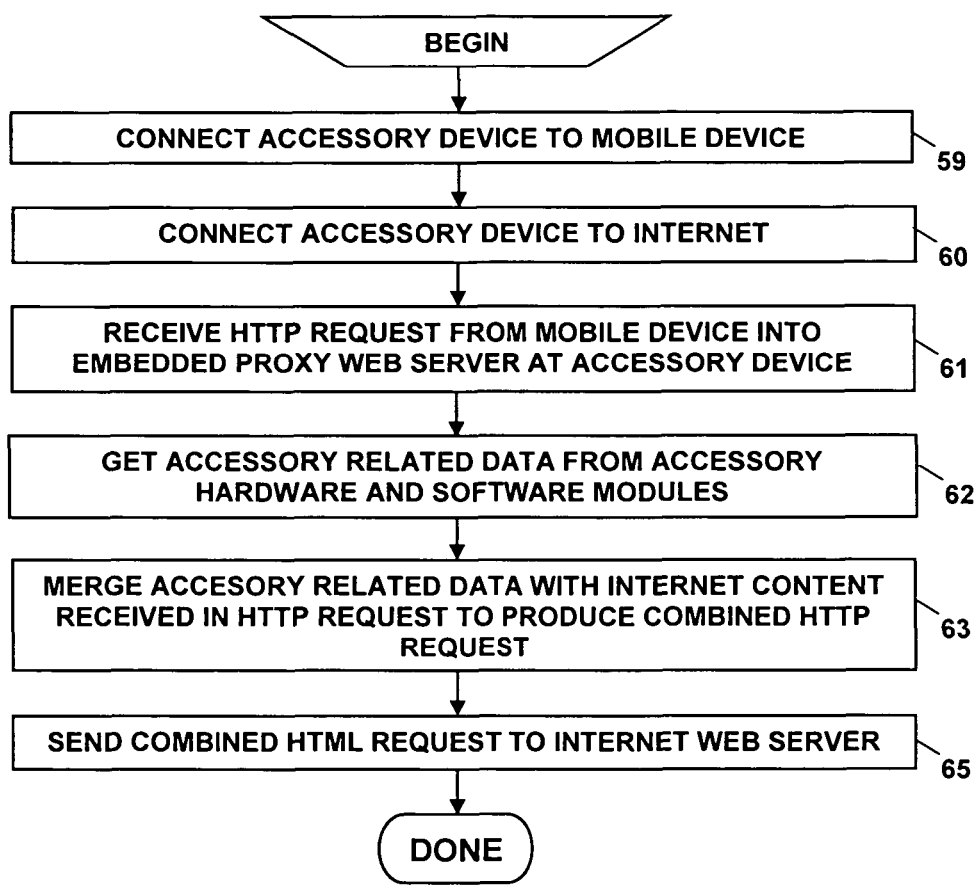
FIG. 6 shows a flow chart of mobile device requesting data from internet through accessory device that enhances the request with accessory data before sending to internet.

FIG. 6 shows a flow chart of method for receiving a HTTP request from mobile device 31 that is processed by accessory device 33 before passing it onto web server 34.

In step 59 accessory device 33 is connected to mobile device 31 using mobile device networking interface 35.

In step 60 accessory device 33 is connected to internet 32 using internet networking interface 36.

In step 61 HTTP request is received from mobile device 31 and routed to embedded proxy web server 37.

In step 62 accessory related data 41 is queried from set of hardware and software modules 39.

In step 63 accessory related data 41 is merged with internet content received in HTTP request from mobile device 31 to produce combined HTTP request as combined request data 64.

In step 65 combined request data 64 is sent to web server 34.

Figure 7:
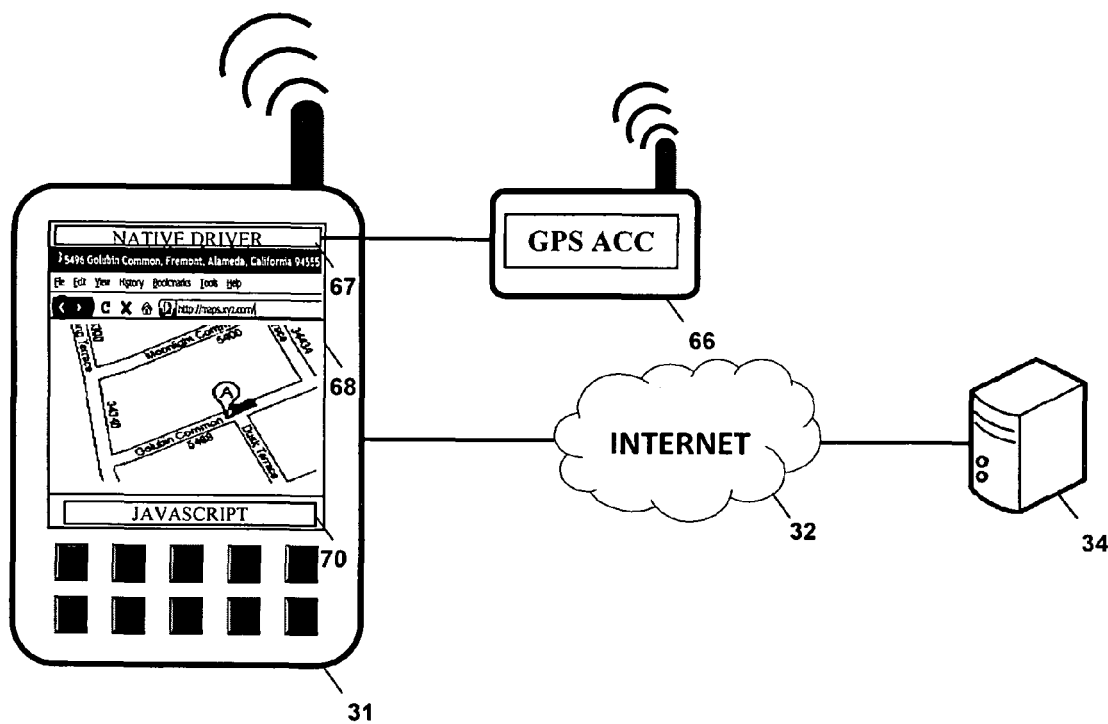
FIG. 7 shows a prior art use case where accessory device is a GPS device that is not integrated with internet content.

FIG. 7 shows a prior art use case where mobile device 31 uses a prior art GPS accessory device 66 to get GPS related data. It uses a native device driver 67 to receive data from prior art GPS accessory device 66. In this scenario mobile device 31 connects to internet 32 to receive a map from web server 34.

This map is shown by embedded web browser 68 of mobile device 31. Prior art GPS accessory device 66 in this case is a global positioning system device. Mobile device 31 uses native device driver 67 to get information from prior art GPS accessory device 66. But data from native device driver 67 is in a different stream and cannot be accessed by web browser 68. Hence it is not possible to integrate GPS data with map data, without loading additional native code that allows browser code to interoperate with native device driver 67. Hence this system cannot be used to extend web based data with a closed mobile device.

Figure 8:
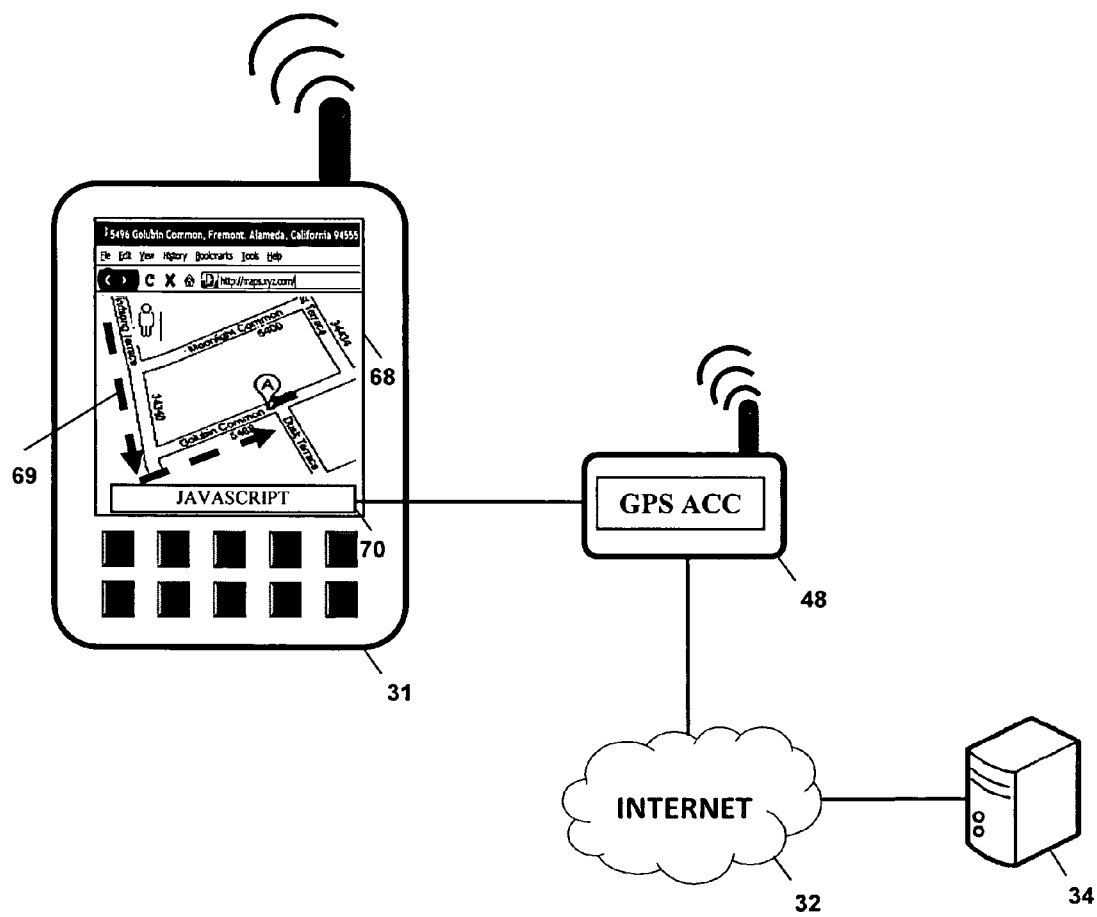
FIG. 8 shows a use case of present invention where accessory device is a GPS device that also supports connection to internet.

FIG. 8 shows an use case of present invention where GPS co-ordinates from GPS accessory device 48 are merged with map data received from web server 34. In this scenario, GPS accessory device 48 receives a request for a map from mobile device 31, which is routed to web server 34 through embedded proxy web server 37. Then GPS accessory device 48 receives a map from web server 34, which is then routed to embedded proxy web server 37. Embedded proxy web server 37 then queries for GPS co-ordinates as accessory related data 41 and combines with the map data to generate combined content 42 and this combined content 42 is then routed to mobile device 31. Map related data is used to compute the route from existing location of a user to the destination. This is represented as dotted arrow path 69. It is to be noted that there is no native device driver in this scenario, and full web integration is supported just using javascript engine in browser 70. Hence this system can be used with any mobile device be it closed or open, with a requirement that it support a standard browser and an internet link using one of local area networking technologies.

Figure 9:
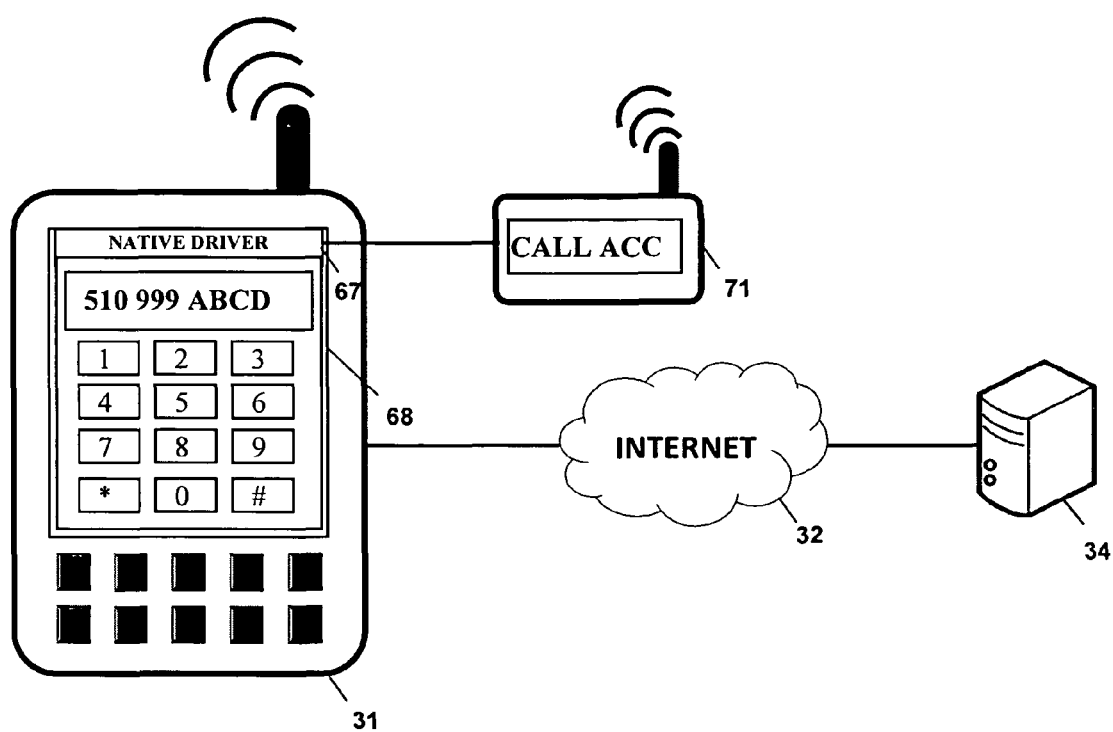
FIG. 9 shows a use prior art use case where accessory device enables making cellular calls that is not integrated with internet content.

FIG. 9 shows a prior art use case where mobile device 31 uses prior art cellular call accessory device 71 to make cellular calls. Since this service is offered only by a native device driver, this cannot have any web page integration. Hence a user cannot browse the web and click on a link representing a phone number to initiate a call directly. This is because data to control call accessory device 71 is in a different stream from data in the browser. Hence the figure shows that call user interface takes over the entire screen of mobile device 31. Hence this accessory cannot be used with closed mobile devices unless new device driver that can interoperate with javascript engine 70 are installed. But this is not the case with standard web browsers. Even if cellular accessory device 71 provides http interface to manage calls, mobile device 31 is not able to receive incoming call indication if mobile device 31 is engaged in browsing session with another web server on the internet.

Figure 10:
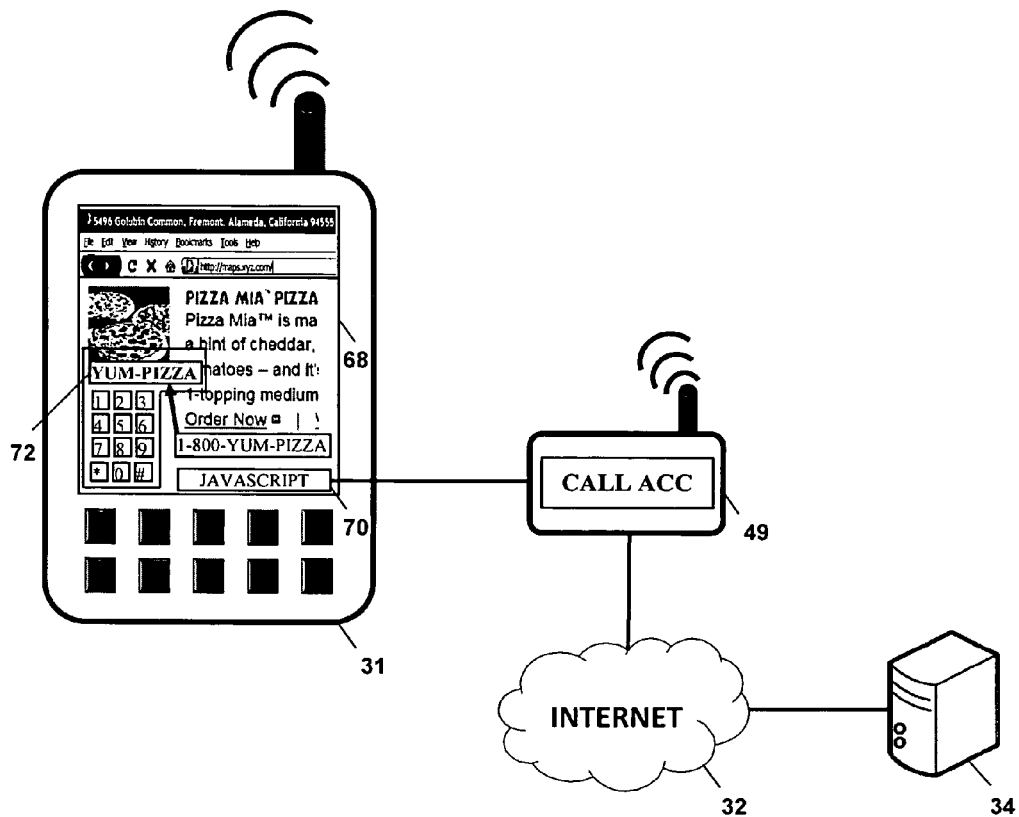
FIG. 10 shows a use case of present invention where accessory device enables making cellular calls that also supports connection to internet.

FIG. 10 shows an use case of present invention where mobile device 31 uses cellular call accessory device 49 to make cellular calls while browsing interne 32. This figure shows that a web page is received at call accessory device 49 which then combines the web page with a user interface that represents a call interface within the web page 72 and automatically fills in the appropriate phone number into the call user interface and then sends a combined web page into mobile device 31. This enables an user to make a call in context of the web page even when he uses mobile device 31 with an external accessory device 49. It is to be noted that there is no native device driver in this scenario, and hence this solution will work with all mobile devices that support a standard browser with local area network connectivity. Hence a user gets to add new hardware functionality that can interoperate with internet applications.

Details of internet content and accessory data combining module 38 at mobile device accessory 33 of present invention.

Data combining module 38 enables combining data that is generated at mobile device accessory 33 with data that passes through embedded proxy web server 37. In order to support proper data integration, data combining module 38 has to implement several methods that enable data integration without compromising usability of a web page, work around browser security issues and provide a seamless enhanced view of an existing web application with accessory data.

Following paragraphs describe nine important methods that data combining module 38 implements in order to address corresponding issues described.

1) Data fetch from accessory device can be manual or automatic

Data fetch and integration from mobile device accessory 33 can be initiated manually when a user makes a HTTP request using a browser to an external origin web server through embedded proxy web server 37 in mobile device accessory 33. In such situations, data combining module 38 may choose to enhance data that is coming in response to the user generated HTTP request by adding appropriate accessory data into the response stream.

But this need not be the only way data combining may need to occur. There could be requests where data combining does not make sense and in those cases, each of the web pages that pass through embedded proxy web server 37 is scanned to determine if the current data context is right for data integration. Only if the context for data combining is correct, a data fetch from mobile device accessory 33 maybe performed followed by data integration into internet content.

2) Handling of synchronous and asynchronous data streams

Data combining module 38 also addresses situations where data from interne is delivered in chunks. Embedded proxy web server 37 keeps track of each of the connections and the connection status in regards to responses that are delivered in chunks. This information is then used by data combining module 38 to keep track of the data combining context and then execute data combining if necessary. Similarly data from interne 40 can be delivered in response to asynchronous javascript requests such as those implemented using a web standard called AJAX. In this case, data combining module 38 keeps track of connections to the javascript engine and delivers any additional data from mobile device accessory 33 if needed.

It is to be noted that an AJAX request is also a HTTP request but a response from a web server is delivered into the javascript runtime in a browser as compared to the HTML parser in the browser.

3) Handling of static HTML pages with fixed layout and dynamic HTML pages with embedded scripts for dynamic layout Data combining module 38 also keeps track of layout issues of each of the HTML pages passing through the embedded proxy web server 37 in mobile device accessory 33. This context is derived by parsing the HTTP requests and corresponding HTML or XML content passing through embedded proxy web server 37.

In particular, if a web page has a map that is being displayed and mobile device accessory 33 has GPS functionality, data combining module 38 keeps track of the bounds of the map that are being displayed in the browser and may convert the latitude and longitude values generated from GPS functionality into two dimensional co-ordinates so that generated GPS coordinates may be converted into appropriate user interface elements and overlaid at the exact location in a map. This is important since most mapping related applications delivered through interne use dynamic HTML to display map related content.

4) Preserving data layout of origin data

Data combining module 38 preserves layout of a web page fetched from an origin HTTP server. This is different from the previous case where the data from accessory may be overlaid onto a map. In this case accessory data may need to be placed in the same layer as data from origin HTTP server. In such cases, data combining module 38 parses the layout of a web page to determine the right context of where accessory data may be added. For example if there is a HTML table representing an address and a phone number, data combining module 38 may add another column to this table to indicate a presence of a phone accessory device which a user may click to make a call without having to enter the phone number manually.

5) Handling cross site script (XSS) security issues

Data combining module 38 also addresses cross site script errors. If the origin HTTP server is a web application hosted outside the users domain, then data from mobile device accessory 33 cannot be combined with data from origin HTTP server using just the browser because access to data from another site is prohibited by any browser. In order to overcome this issue, accessory data is combined in data combining module 38 with the HTTP data passing through embedded proxy web server 37, and corresponding javascript scripts are inserted that enables access to the entire document object model hierarchy (DOM) of any web page. This enables bypassing cross site script errors.

6) Handling HTTP and HTTPS protocols

Data combining module 38 also keeps track of what kind of HTTP protocol is being used. Since embedded proxy web server 37 maintains two HTTP connections, one to mobile device and another to origin HTTP server, it also handles HTTPS connections which is a secure form of HTTP connection. In the case where a connection from the browser is a HTTPS connection, data combining module 38 keeps track of two sets of hash keys corresponding to the two HTTPS connections. This prevents the browser from throwing a security exception which would otherwise occur if the HTTPS data were intercepted and modified without updating the hash keys.

7) Entering data from accessory into HTML form elements automatically

Data combining module 38 also enables entering data into form elements in a HTML page automatically. This is done by maintaining a context of what form elements exist in the desired HTML pages that need automatic form data entry. If the desired page passes through embedded proxy web server 37, then data combining module 38 automatically inserts data into form elements if the context for data combining is appropriate.

8) Entering data into form elements that are already displayed in the browser

Data combining module 38 also enters data into form elements that are already shown in a browser. This is done by maintaining a context of already displayed web pages in the mobile device 31 and corresponding form elements that need repeated data entry. Data combining module 38 inserts javascript code into the web page from origin HTTP server. This javascript code sets up an AJAX connection into embedded web proxy server 37 and corresponding data combining module 38. With this AJAX connection, new data from data combining module 38 can be passed to javascript code in the browser which then can insert the new data into existing form elements.

9) Entering data into form elements and activating data entry validation scripts Data combining module 38 also keeps track of which form entries have data entry validation scripts. If data combining module 38 encounters a form field that has a data entry validation script associated with it, data combining module 38 enters data by simulating keystrokes instead of a direct merge or it may enter the data and then call the appropriate form field data entry keypress handler which then will initiate the corresponding data entry validation script.

Advantages

From the description above a number of advantages of this interactive radio system become evident:
- a) an accessory to a mobile device is provided, that can interoperate with content from internet without loading native device drivers into the mobile device;
- b) an accessory to a mobile device is provided, that enhances applications programmed using HTML and are deployed in the internet; and
- c) an accessory to a closed or open mobile device is provided with additional functionality that can interoperate with contents of internet

CONCLUSION, RAMIFICATIONS AND SCOPE

Accordingly, the reader will see that combining an accessory device with an enhanced embedded proxy web server, provides an unobvious result of enhancing internet content with accessory functionality and vice versa.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

We claim:

1. A method to provide enhanced Internet content to a mobile device using an accessory device, comprising:
- a) providing said accessory device with an Internet networking interface that enables connection to the Internet to fetch Internet content;
- b) providing said accessory device with a mobile device networking interface that enables connection to said mobile device;
- c) providing said accessory device with a set of hardware and software modules configured to provide functionality in addition to Internet connectivity;
- d) providing said accessory device with an embedded proxy web server;
- e) providing said accessory device with a data combining module, coupled to said embedded proxy server, configured to combine data from said Internet content with data from said set of hardware and software modules and send the combined data to the mobile device; and
- f) placing said accessory device in proximity to said mobile device.

2. The method of providing enhanced Internet content to a mobile device of claim 1, further comprising:
- a) receiving content data from the Internet using said Internet networking interface of said accessory device;
- b) generating data in said accessory device related to accessory functionality;

c) combining said data related to accessory functionality with said data from the Internet to produce combined data in said proxy web server; and d) sending said combined data to said mobile device using said mobile device networking interface.

3. The method of providing enhanced Internet content to a mobile device of claim 2, further comprising:

a) requesting Internet data from said mobile device using an accessory device networking interface at said mobile device that enables communication to said accessory device;

b) intercepting said request at said accessory device;

c) passing said request to said proxy web server to generate a proxy request for Internet data; and d) passing said proxy request to the Internet using said Internet connection interface.

4. The method of providing enhanced Internet content to a mobile device of claim 1, wherein said mobile device is selected from group consisting of personal digital assistant, mobile phone, smartphone, and portable media player.

5. The method of providing enhanced Internet content to a mobile device of claim 1, wherein said accessory device comprising said Internet connection interface is selected from group consisting of cellular phone line connection accessory device, global position system accessory device, camera accessory device, medical accessory device, radio broadcast receiver device, and television broadcast receiver device.

6. The method of providing enhanced Internet content to a mobile device of claim 1, wherein said Internet connection interface is selected from group consisting of cellular packet data network interface, wireless fidelity network interface, satellite packet data network interface, packet data interface based on orthogonal frequency division multiplexing technology, and other terrestrial packet data interface.

7. The method of providing enhanced Internet content to a mobile device of claim 1, wherein said mobile device connection interface is selected from group consisting of physical electronic connection interface, personal area network wireless interface, wireless fidelity network interface, and other local area network data interface.

8. The method of providing enhanced Internet content to a mobile device of claim 1, wherein said internet content is in data format selected from the group consisting of hyper text meta language content, and extended meta language content.

9. An accessory device of a mobile device, comprising:

a) an Internet networking interface that enables connection to the Internet to fetch Internet content;

b) a mobile device networking interface that enables connection to said mobile device;

c) a set of hardware and software modules configured to provide functionality in addition to Internet connectivity;

d) an embedded proxy web server; and e) an Internet content and accessory data combining module configured to combine data from said Internet content with data from said set of hardware and software modules and to send the combined data to said mobile device.

10. The accessory device of claim 9, wherein said mobile device is selected from group consisting of personal digital assistant, mobile phone, smartphone, and portable media player.

11. The accessory device of claim 9, wherein said accessory device comprising said Internet connection interface is selected from group consisting of cellular phone line connection accessory device, global position system accessory device, camera accessory device, medical accessory device, radio broadcast receiver device, and television broadcast receiver device.

12. The accessory device of claim 9, wherein said Internet connection interface is selected from group consisting of cellular packet data network interface, wireless fidelity network interface, satellite packet data network interface, packet data interface based on orthogonal frequency division multiplexing technology, and other terrestrial packet data interface.

13. The accessory device of claim 9, wherein said mobile device connection interface is selected from group consisting of physical electronic connection interface, personal area network wireless interface, wireless fidelity network interface, and other local area network data interface.

14. The accessory device of claim 9, wherein said Internet content is in data format selected from group consisting of hyper text meta language content, and extended meta language content.

15. A system that provides enhanced Internet content to a mobile device using an accessory device comprising:

a mobile device comprising an accessory device networking interface that enables communication with said accessory device;

said accessory device comprising
 a mobile device networking interface;
 an Internet networking interface;
 a set of hardware and software modules to provide accessory functionality in addition to Internet connectivity;
 an embedded proxy server; and
 an Internet content and accessory data combining module;

wherein said accessory device is in proximity to said mobile device, said embedded proxy server is configured to intercept an Internet content request from said mobile device, fetch the requested content via the Internet networking interface, and provide the requested content to the Internet content and accessory data combining module;

said internet content and accessory data combining module is configured to combine said requested content with data from said set of hardware and software modules to produce combined data; and said accessory device is configured to send said combined data to said mobile device via the mobile device networking interface.

16. The system of claim 15, wherein said mobile device is selected from group consisting of personal digital assistant, mobile phone, smartphone, and portable media player, and said accessory device is selected from group consisting of cellular phone line connection accessory device, global position system accessory device, camera accessory device, medical accessory device, radio broadcast receiver device, and television broadcast receiver device.

17. The system of claim 15, wherein said Internet networking interface at said accessory device is selected from group consisting of cellular packet data network interface, wireless fidelity network interface, satellite packet data network interface, packet data interface based on orthogonal frequency division multiplexing technology, and other terrestrial packet data interface.

18. The system of claim 15, wherein said mobile device networking interface at said accessory device is selected from group consisting of physical electronic connection interface, personal area network wireless interface, wireless fidelity network interface, and other local area network data interface.

19. The system of claim 15, said Internet content is in data format selected from group consisting of hyper text meta language content, and extended meta language content.

* * * * *